United States Patent
Smyth

[15] 3,682,335
[45] Aug. 8, 1972

[54] LAUNCHING DEVICE FOR BOAT TRAILERS

[72] Inventor: William P. Smyth, 49-06, 21st Avenue, Jackson Heights, N.Y. 11370

[22] Filed: June 11, 1970

[21] Appl. No.: 45,420

[52] U.S. Cl. .................................... 214/82, 214/84
[51] Int. Cl. ............................................. B60p 3/10
[58] Field of Search......... 214/505, 506, 85.1, 82, 517

[56] References Cited

UNITED STATES PATENTS

| | | | |
|---|---|---|---|
| 3,149,735 | 9/1964 | Bleecker | 214/82 X |
| 3,303,952 | 2/1967 | Bissinger | 214/517 |
| 2,120,042 | 6/1938 | Remde | 214/505 X |
| 3,497,094 | 2/1970 | Conner et al. | 214/517 |

*Primary Examiner*—Albert J. Makay
*Attorney*—Morgan, Finnegan, Durham & Pine

[57] ABSTRACT

A device for launching a boat from a boat trailer having running gear, a frame mounted on said running gear for supporting a boat thereon, a tongue extending from the front end of said frame and a winch mounted on said tongue and having a cable windable thereon, said device comprising a pair of guide members in transverse relationship on opposite sides of said frame and positioned above the horizontal plane of said frame, a bridle extending around the bow of a boat on said frame and then rearwardly along the opposite sides of said boat through said guide members and then forwardly toward said winch, and yoke means interposed between said winch and said guide members for connecting said winch cable to said bridle. The yoke means is comprised of a plate having a plurality of slots originating from an enlarged opening, knots in the bridle are passable through said enlarged opening but not through the slots. The device, according to the present invention, is such that in addition to facilitating the launching of the boats from trailers, it is at all times easily accessible and also adjustable to the particular boat trailer combination.

14 Claims, 5 Drawing Figures

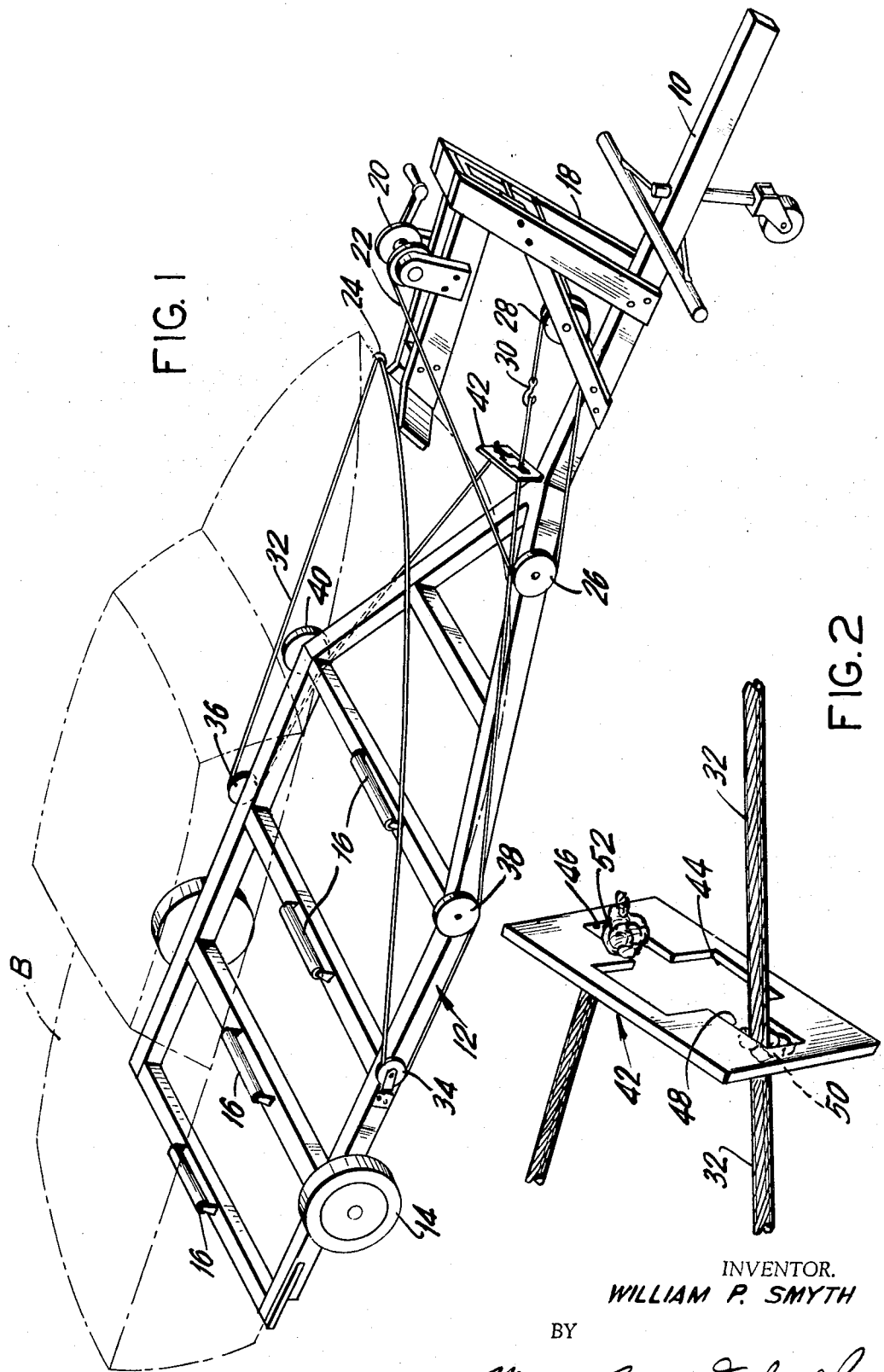

INVENTOR.
WILLIAM P. SMYTH
BY
Morgan, Finnegan, Durham & Pine
ATTORNEYS

LAUNCHING DEVICE FOR BOAT TRAILERS

BACKGROUND OF THE INVENTION

1. Field of the Invention

This invention relates to an improved device for launching boats from boat trailers which can be utilized on any boat-trailer combination. In addition, the present invention relates to a launching device which is at all times easily accessible, adjustable and non-chafing.

2. Description of the Prior Art

Boat-trailers usually are provided with a winch, keel guide, rollers, cradles and the like, which facilitate the loading of the boat while it is being transported on the trailer. By the use of a suitable winch and the guiding devices mentioned above, a relatively large boat can be loaded on a trailer when the trailer is backed into the water and immersed a sufficient depth to allow the bottom of the boat to be floated over the rear cross member of the trailer.

In order to launch the boat from the trailer into the water, a more difficult problem is presented. One method in use is to back the trailer down a boat launching ramp, or other facility, and immerse it to a sufficient depth to enable the boat to be floated from the trailer. It is obvious, however, that this method of launching a boat from a trailer cannot be utilized in localities where suitable facilities are not provided. In such a situation, a large number of people and a great deal of effort are required to lift and push the boat from the trailer.

Launching devices for launching boats from trailers are therefore necessary in order to obtain the fullest enjoyment from boating. The U.S. Pat. to Bleecker, No. 3,149,735, issued Sept. 22, 1964, is directed to such a launching device. What is described is a system for launching a boat from a trailer which includes a bridle which is passed around the bow of the boat and then around pulleys at the rear of the trailer and then connected to the winch cable, thus enabling the boat trailer winch to be used to direct the boat towards the rear of and launch it from the trailer. The Bleecker device, or any other launching device, requires that the boat trailer be backed into the water to a sufficient depth to launch the boat. Since much of the mechanism and the lines are beneath the boat trailer, and are therefore relatively inaccessible, any adjustments required during the launching operation are difficult.

Launching devices for launching boats from boat trailers, including the Bleecker device, are for the most part non-adjustable and are sold for particular boat-trailer combinations. Therefore, when either the boat or boat trailer is changed and a different one substituted therefor, it may be necessary to also change the device. In addition, there are boat trailers on the market which cannot accommodate some one of these devices. For example, the Bleecker device does not appear to be suitable for use with a tilt bed trailer, nor with trailers which do not have the keel rollers raised above the keel guide member.

It is also to be noted that since current launching devices have a portion of their system below the horizontal plane formed by the cross members of the boat trailer, the possibility of the lines chafing and rubbing on the trailer frame exists. This will result in unnecessary wear on the line which may cause it to break and also results in wasted energy.

SUMMARY OF THE INVENTION

It is an object of the present invention to provide a launching device for launching boats from boat trailers which may be installed and used on any trailer. It is a further object of the present invention to provide a launching device for launching boats from boat trailers which is adjustable for any boat trailer combination.

It is a further object of the present invention to provide a launching device for launching boats from boat trailers which is easily accessible during the boat launching operation.

It is yet a further object of the present invention to provide a launching device for launching boats from boat trailers whereby the lines will not chafe or rub against the trailer frame.

For accomplishing the above objects, the boat launching system of the instant invention has been developed. In accordance with the present invention, the boat launching system enables a boat to be unloaded from a trailer with no greater difficulty than loading the boat on to the trailer, even under conditions where the depth of the water or an abrupt drop-off of the shore line prevents the trailer from being immersed sufficiently to float the boat off the trailer.

The boat launching device of the present invention is comprised of a pair of guide members in transverse relationship on opposite sides of a boat trailer frame and positioned above the horizontal plane of said frame, a bridle extending around the bow of a boat on said frame and then rearwardly along the opposite sides of said boat through said guide members and then forwardly toward a winch associated with said boat trailer, and yoke means interposed between said winch and said guide members for connecting a winch cable to said bridle.

In accordance with the present invention, a boat launching system is provided which includes an adjustable bridle which is passed around the bow of the boat and thence through guides such as pulleys on either side of the trailer frame and then connected to the winch cable, thus enabling the boat trailer winch to be used to direct the boat towards the rear of and launch it from the trailer. With this launching device, one man can launch even a large boat from a trailer without difficulty under conditions where it would have been impossible for him to launch the boat without assistance.

The particular arrangement of the boat launching system of the present invention where no part of the system is beneath the boat trailer or otherwise inaccessible, allows for prompt and easy adjustment when necessary during the launching operation. In addition, because of the adjustability of the bridle and the pulley arrangement, etc., the boat launching system of the present invention may be adapted for use on any boat trailer or boat trailer combination.

BRIEF DESCRIPTION OF THE DRAWINGS

The invention will be described and understood more readily when considered with the attached drawings in which:

FIG. 1 schematically depicts a boat trailer with a boat thereon shown in dotted lines and including the launching system of the present invention;

FIG. 2 is a perspective view of the yoke of FIG. 1 with a portion of the bridle shown;

DESCRIPTION OF THE PREFERRED EMBODIMENTS

Figure 3:
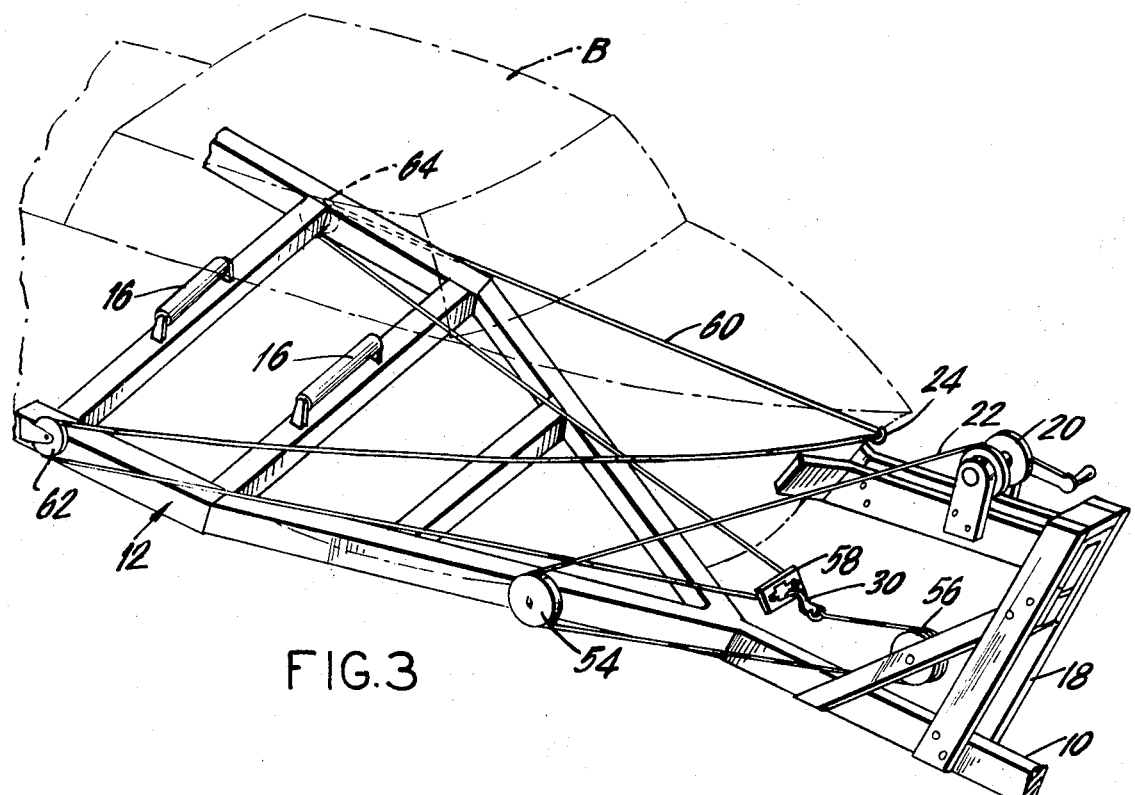
FIG. 3 schematically depicts a portion of a boat trailer with a boat thereon shown in dotted lines and including another embodiment of the launching system of the present invention.

Now referring to FIGS. 1 and 2 of the drawings, the trailer includes a tongue 10 which extends forwardly from frame 12 which in turn is supported by running gear 14. The frame 12 also includes support rollers 16 which support and stabilize the boat B on the trailer. At the front of the trailer is mounted a winch stand 18 having a winch 20 thereon. The winch 20 may be hand operated or power operated as desired. Additional supports for the boat B may be provided as needed in the case of larger boats. The winch 20 is provided with a winch cable 22 which is adapted to be connected to an eye 24 or other member on the bow of the boat so that when the winch 20 is operated, the boat B can be pulled up on to the trailer and supported thereby.

In accordance with the present invention, the winch cable 22 is passed around pulley 26 and extended toward pulley 28. Pulley 26 may not be necessary under circumstances when winch cable 22 is able to pass directly to pulley 28 from winch 20. The hook 30, or other connecting means, at the end of the winch cable 22 engages with one end of the bridle 32. The bridle 32 passes around the bow of the boat B, preferably supported by resting upon or being attached to the bow eye 24 of the boat, along the sides of the boat, around the pulleys 34 and 36, along the sides of frame 12, around pulleys 38 and 40 and is provided with a yoke 42. Pulleys 38 and 40 are provided in this embodiment for the purpose of keeping the bridle 32 from rubbing or chafing on the bow of the boat B. The yoke is depicted in FIG. 2 along with a portion of bridle 32. The yoke 42 is provided with an opening 44 through which a knot or other enlarged area of the bridle 32 is passable. Slots 46 and 48 originate at opening 44 and are such that a knot in the bridle 32 which will pass through opening 44 will not pass through the slots. The bridle 32 is provided with a series of knots thus allowing the length of the bridle to be adjusted if conditions so require. One end of bridle 32 passes through slot 48 and is connected to the winch cable 22, knot 50 stops the bridle from passing through slot 48 when the winch cable 22 is wound on winch 20. Knot 52 on the other end of bridle 32 also acts to maintain the bridle in engagement with the yoke 42. The yoke 42, in conjunction with the knotting arrangement described, allows the forces exerted by the winch cable 22 to be distributed equally along both sides of the bridle 32 to draw the boat rearwardly on the trailer and launch it.

In launching the boat B, the trailer may be backed into or close to the water in an area where the water is deep enough to float the boat after it has been launched from the trailer. The winch 20 is then operated to wind up the winch cable 22 thereby pulling the yoke 42 forwardly and at the same time drawing rearwardly the portion of the bridle 32 extending around the bow of the boat B. Since all of the pulleys, the bridle, the winch cable, etc., are above the horizontal plane of the trailer frame, the system may be repaired or adjusted as required even during the launching operation without the necessity of going beneath the trailer or moving the trailer.

Figure 5:
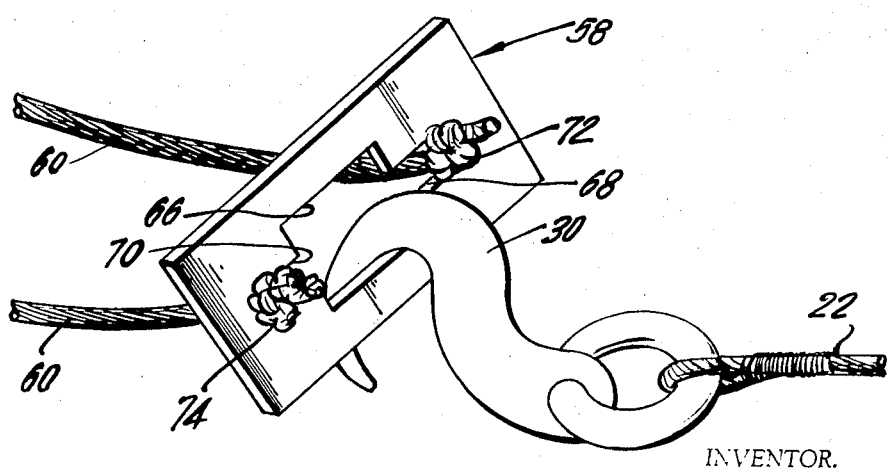
FIG. 5 is a perspective view of the yoke of FIG. 3 with a portion of the bridle and the winch cable shown.

Referring now to FIGS. 3 and 5 of the drawings, another embodiment of the present invention is depicted which is basically the same as the above description. The difference in the two embodiments lies mainly in the arrangement of pulleys and in the bridle winch cable connection. The winch cable 22 is passed around pulley 54 and then around pulley 56. The hook 30 at the end of the winch cable is engaged with the yoke 58 attached to the ends of the bridle 60. The bridle 60 passes around the bow of the boat B, along the sides of the boat, around the pulleys 62 and 64, terminating at yoke 58. The yoke of this embodiment is depicted in FIG. 5 along with a portion of bridle 60. The yoke 58 is comprised of a plate having a centrally located opening 66 and two slots 68 and 70 originating at the centrally located opening. The two ends of bridle 60 have knots 72 and 74, or other enlarged areas, which cannot pass through slots 68 and 70 but can pass through opening 66. The bridle 60 may have additional knots along its length thereby allowing the bridle length to be adjusted to accommodate various boat trailer combinations. In operation, this embodiment is similar to that described in FIGS. 1 and 2.

Figure 4:
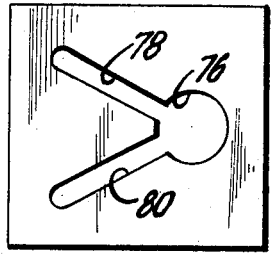
FIG. 4 is a variation in the form of the yoke utilized in the present launching system.

FIG. 4 depicts another embodiment of the yoke of FIGS. 2 and 5. Opening 76 allows passage of a knot in the bridle while slots 78 and 80 do not allow such passage but serve to hold the knots from passing through. Opening 76 and slots 78 and 80 are disposed to accommodate the stresses produced in the yoke.

From the foregoing description, it is apparent that a simple yet effective boat launching system is provided and that the boat launching device is susceptible to modification and adjustment to be adaptable to any boat trailer combination. In addition, since all the individual devices, cables, etc., are located above the horizontal plane of the frame, necessary adjustments and repairs may be performed easily and quickly.

It is to be noted that the scope of the present invention is not to be limited by the above descriptions, but includes any and all forms which properly come within the scope of the following claims.

What is claimed is:

1. An adjustable device for lauching a boat from a boat trailer having a running gear, a frame mounted on said running gear for supporting a boat thereon, a tongue extending from the front end of said frame and a winch mounted on said tongue and having a cable windable thereon, said device comprising:
    a. a pair of guide members in transverse relationship on said frame;
    b. a plate interposed between the winch and said guide members including;
        i. an opening therethrough; and
        ii. a pair of slots in said plate extending from said opening;
    c. an adjustable bridle having ends extending around the bow of a boat on side frame and then rearwardly along the opposite sides of the boat through said pair of guide members on said frame and then forwardly through said plate where the end portions of said bridle had enlarged areas adapted to pass through said opening but not through said slots in said plate for operatively connecting said bridle to said plate in an adjustable manner; and d. means for connecting said winch cable to said bridle.

2. A device for launching a boat from a boat trailer as defined in claim 1 which further comprises a second pair of guide members in transverse relationship on opposite sides of and in proximity to the front of said frame and positioned above the horizontal plane of said frame.

3. The device for launching a boat from a boat trailer as defined in claim 1 wherein the means for connecting the winch cable to the bridle comprises a hook associated with said winch cable engageable with the centrally located opening of the yoke means.

4. The device for launching a boat from a boat trailer as defined in claim 1 wherein the means for connecting the winch cable to the bridle comprises a hook associated with said winch cable engageable with one end of said bridle.

5. A device for launching a boat from a boat trailer having running gear, a frame mounted on said running gear for supporting a boat thereon, a tongue extending from the front end of said frame and an elevated winch mounted on said tongue and having a cable windable thereon, said device comprising:

a. a guide member mounted below said winch on said tongue and above the horizontal plane of said frame for guiding said winch cable;

b. a pair of guide members in transverse relationship on opposite sides of said frame and positioned above the horizontal plane of said frame;

c. bridle securing means interposed between the guide member on said tongue and the guide members on said frame;

d. an adjustable bridle having ends extending around the bow of a boat on said frame and then rearwardly along the opposite sides of said boat through the guide members on said frame and then forwardly where said ends are connected to said bridle securing means and where at least one end is adapted to be connected to said bridle securing means at a plurality of locations to provide a bridle of adjustable operative length; and e. means for connecting said winch cable to said bridle, to thereby provide a launching device which is easily accessible and adjustable.

6. The device for launching a boat from a boat trailer as defined in claim 5 which further comprises a second pair of guide members in transverse relationship on opposite sides of and in proximity to the front of said frame and positioned above the horizontal plane of said frame.

7. The device for launching a boat from a boat trailer as defined in claim 5 wherein the bridle securing means comprises:

a. a metal plate having a centrally located opening;

b. a pair of slots in said metal plate transversely originating at said opening; and c. said opening and said slots being dimensioned such that knots in said bridle will pass through side opening but not through said slots.

8. The device for launching a boat from a boat trailer as defined in claim 7 wherein the means for connecting the winch cable to the bridle comprises a hook associated with said winch cable engageable with the centrally located opening of the yoke means.

9. The device for launching a boat from a boat trailer as defined in claim 7 wherein the means for connecting the winch cable to the bridle comprises a hook associated with said winch cable engageable with one end of said bridle.

10. A device for launching a boat from a boat trailer having running gear, a frame mounted on said running gear for supporting a boat thereon, a tongue extending from the front end of said frame and an elevated winch mounted on said tongue and having a cable windable thereon, said device comprising:

a. a first guide member mounted below said winch on said tongue and positioned above the horizontal plane of said frame;

b. a second guide member mounted on and to one side of the center line of said frame whereby said winch cable may be guided to said first guide member when the winch cable cannot pass directly from the winch to the first guide member;

c. a pair of guide members in transverse relationship on opposite sides of said frame and positioned above the horizontal plane of said frame;

d. yoke means interposed between the first guide member and the pair of guide members on said frame;

e. an adjustable bridle having ends extending around the bow of a boat on said frame and then rearwardly along the opposite sides of said boat through the pair of guide members on said frame and then forwardly where said ends are connected to said yoke means and where one end is adapted to be connected to said yoke means at a plurality of locations to provide a bridle of adjustable operative length; and f. means for connecting said winch cable to said bridle, to thereby provide a launching device which is easily accessible and adjustable.

11. The device for launching a boat from a boat trailer as defined in claim 10 which further comprises a second pair of guide members in transverse relationship on opposite sides of and in proximity to the front of said frame and positioned above the horizontal plane of said frame.

12. The device for launching a boat from a boat trailer as defined in claim 10 wherein the yoke means comprises:

a. a metal plate having a centrally located opening;

b. a pair of slots in said metal plate transversely originating at said opening; and c. said opening and said slots being dimensioned such that knots in said bridle will pass through said opening but not through said slots.

13. The device for launching a boat from a boat trailer as defined in claim 12 wherein the means for connecting the winch cable to the bridle comprises a hook associated with said winch cable engageable with the centrally located opening of the yoke means.

14. The device for launching a boat from a boat trailer as defined in claim 12 wherein the means for connecting the winch cable to the bridle comprises a hook associated with said winch cable engageable with one end of said bridle.

\* \* \* \* \*